United States Patent [19]

Nishiyama

[11] Patent Number: 5,029,442
[45] Date of Patent: Jul. 9, 1991

[54] HEAT FEEDING APPARATUS FOR INTERNAL COMBUSTION ENGINE HAVING SUPERCHARGER ATTACHED

[75] Inventor: Toshihiko Nishiyama, Oyama, Japan

[73] Assignee: Kabushiki Kaisha Komatsu Seisakusho, Tokyo, Japan

[21] Appl. No.: 336,148

[22] Filed: Apr. 11, 1989

[30] Foreign Application Priority Data

Apr. 11, 1988 [JP] Japan ............................ 63-47729[U]

[51] Int. Cl.$^5$ ............................................. F02B 37/00
[52] U.S. Cl. .................................... 60/606; 122/20 B;
236/20 R; 237/12.1
[58] Field of Search ................. 60/606, 618; 237/12.1;
236/20 R; 122/20 B

[56] References Cited

U.S. PATENT DOCUMENTS

| 2,159,758 | 5/1939 | Diedrich | 60/606 |
| 2,633,698 | 4/1953 | Nettel | 60/599 |
| 3,676,999 | 7/1972 | Oldfield | 60/606 |
| 4,077,219 | 3/1978 | Melchior | 60/606 |
| 4,160,365 | 7/1979 | Petrov | 60/606 |
| 4,508,261 | 4/1985 | Blank | 236/20 R |

OTHER PUBLICATIONS

SAE-Society of Automotive Engineers, Inc., "Hyperbar System of High Supercharging", by Jean Melchior and Thierry Andre-Talamon, 9-74.

Primary Examiner—Douglas Hart
Attorney, Agent, or Firm—Diller, Ramik & Wight

[57] ABSTRACT

A heat feeding apparatus employable for an internal combustion engine having a supercharger attached thereto, the apparatus including a compressed air bypass passage opening/closing valve disposed midway of a compressed air bypass passage by way of which the outlet of a blower is communicated with the inlet of a turbine in the supercharger and combustion means installed in an inlet region of the turbine, wherein opening or closing of the compressed air bypass passage opening/closing valve and combustion in the combustion means are initiated in dependence on the temperature of a specific kind of medium for which heat exchanging is effected in a heat exchanger, whereby a heat involved in the exhaust gas is transmitted to the heat exchanger in dependence on the demand required by the medium.

4 Claims, 3 Drawing Sheets

HEAT FEEDING APPARATUS FOR INTERNAL COMBUSTION ENGINE HAVING SUPERCHARGER ATTACHED

BACKGROUND OF THE INVENTION

1. Field of the Invention

The present invention relates to a heat feeding apparatus employable for an internal combustion engine having a supercharger attached thereto wherein an exhaust gas is introduced from a turbine in the supercharger into a heat exchanger so that a heat involved in the exhaust gas is fed to a specific kind of medium in the heat exchanger by way of heat exchanging. More particularly, it relates to a heat feeding apparatus preferably employable for a case where a quantity of heat required by the medium is varied.

2. Description of the Prior Art

A conventional heat feeding apparatus employable for an internal combustion engine having a supercharger attached thereto is typically constructed as illustrated in FIG. 3.

Specifically, with the conventional apparatus shown in the drawing, the exhaust gas which has passed through a turbine in a supercharger b adapted to be driven by the exhaust gas from an internal combustion engine a is introduced into a heat exchanger c. On the other hand, the hot water which has passed through a heat exchanger d for cooling the internal combustion engine a is introduced into the heat exchanger c so that heat exchanging is effected between the exhaust gas and the hot water in the heat exchanger. Then, hot water or steam generated from the hot water having an elevated temperature is used as air conditioning source or a power supply source for various consumer machines.

With respect to the internal combustion engine a, a predetermined amount of output therefrom is fed to a dynamo e so as to allow a predetermined magnitude of electricity to be generated by it.

In this manner, a quantity of thermal energy to be derived from the exhaust gas is determined dependence on the foregoing output from the internal combustion engine in a one-to-one relationship. Accordingly, in a case where there is a need of heating a large quantity of hot water to a higher level of temperature in the heat exchanger c, a shortage may occur with the quantity of heat from the exhaust gas which has been determined in accordance with the above one-to-one relationship.

To obviate the foregoing problem, it is required that the hot water in the heat exchanger c is introduced into an auxiliary boiler f in which it is heated up further to a higher temperature. If the auxiliary boiler should additionally be installed to meet the requirement, it is practically difficult to acquire a space required for installing it. Consequently, a highly increased amount of expenditure is required for the whole installation.

SUMMARY OF THE INVENTION

The present invention has been made with the foregoing background in mind and its object resides in providing a heat feeding apparatus employable for an internal combustion engine having a supercharger attached thereto which assures that a heat involved in an exhaust gas can be fed to a specific kind of medium, such as water, in correspondence to a quantity of heat required by the medium to be subjected to heat exchanging in a heat exchanger, at an inexpensive cost without necessity for additional space required for installing the apparatus.

To accomplish the above object, the present invention provides a heat feeding apparatus of the initially-mentioned type employable for an internal combustion engine having a supercharger attached thereto, wherein the apparatus comprises a compression air bypass passage by way of which the outlet of a blower is communicated with the inlet of the turbine, a compressed air bypass passage opening/closing valve disposed midway of the compressed air bypass passage to open or close the latter, and combustion means disposed in an inlet region of the turbine to inject a fuel into the compressed air which has passed through the compressed air bypass passage opening/closing valve, the fuel being ignited in the combustion means.

With such construction, provision of the compressed air bypass passage assures that a part of the compressed air compressed by the blower can be introduced into the inlet port of the turbine.

Further, provision of the compressed air bypass passage opening/closing valve assures that the compressed air which has passed through the compressed air bypass passage can be introduced into the inlet port of the turbine, as required.

In addition, provision of the combustion means assures that the compressed air which has passed through the compressed air bypass passage opening/closing valve can be burnt in the presence of a fuel in an inlet region of the turbine. Consequently, a thermal energy involved in the combustion gas can quickly be converted into a work in the turbine to provide an increased magnitude of output from the turbine without an occurrence of siginificant conversion of the thermal energy into a work in the internal combustion engine. Additionally, a quantity of heat equal to the shortage relative to the quantity of heat required by the medium flowing through the heat exchanger can be given to the latter.

Other objects, features and advantages of the present invention will become more readily apparent from a reading of the following description which has been made with reference to the accompanying drawings.

BRIEF DESCRIPTION OF THE DRAWINGS

The present invention is illustrated in the following drawings in which.

DESCRIPTION OF THE PREFERRED EMBODIMENTS

Now, the present invention will be described in detail hereinafter with reference to the accompanying drawings which illustrate preferred embodiments thereof.

Figure 1:
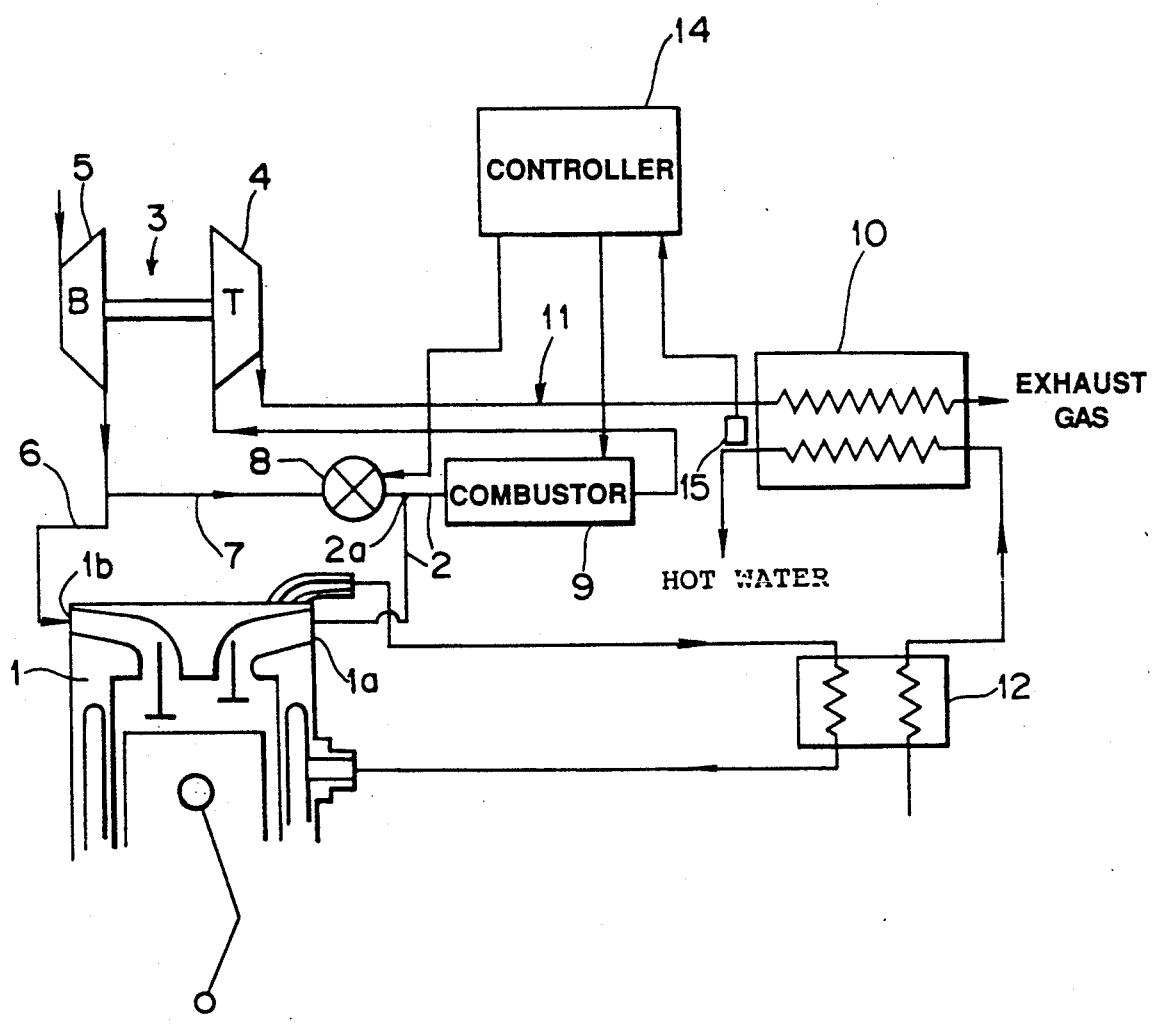
FIG. 1 is a schematic view illustrating a heat feeding apparatus employable for an internal combustion engine having a supercharger attached thereto in accordance with an embodiment of the present invention.

FIG. 1 is a schematic view illustrating a heat feeding apparatus employable for an internal combustion engine having a supercharger attached thereto in accordance with an embodiment of the present invention.

As shown in the drawing, an internal combustion engine has an exhaust port 1a through which an exhaust gas is discharged therefrom. The exhaust gas is introduced into the interior of a turbine 4 in a supercharger 3 via an exhaust gas passage 2 so as to allow the turbine 4 to be driven by the exhaust gas. This causes a blower 5 mounted on the rotational shaft concentrically relative to the turbine 4 to be rotated. As the blower 5 is rotated, the sucked air is compressed and the compressed air is then fed to an intake port 1b on the internal combustion engine 1 via an intake air passage 6.

On the other hand, the apparatus has a compressed air bypass passage 7 by way of which the intermediate part of the intake air passage 6 is communicated with the exhaust gas passage 2 at an inlet region 2a for the turbine 4.

An opening/closing valve 8 adapted to open or close the compressed air bypass passage 7 so as to allow the compressed air compressed by the blower 5 to flow or interrupt the flowing thereof is disposed midway of the compressed air bypass passage 7. In addition, a combustor 9 for burning in the presence of a fuel the compressed air which has passed through the opening/closing valve 8 is disposed midway of the exhaust gas passage 2 between the turbine 4 and the inlet region 2a of the turbine 4.

The combustor 9 is provided with a fuel injection pump and an igniter both of which are not shown in the drawing. The fuel injection pump and the igniter permit a required amount of fuel to be introduced into the compressed air which has passed through the compressed air bypass passage 7 so that it is ignited. In this manner, the compressed air is mixed with the fuel and the mixture is then burnt, whereby a combustion gas having high temperature and high pressure can be generated.

Then, the combustion gas is introduced into the inlet port of the turbine 4 and a heat involved in the combustion gas is converted into a work of the turbine 4 so that the latter is rotated with a higher magnitude of driving force than that derived from the exhaust gas which has been discharged from the internal combustion engine 1 through the exhaust port 1a.

The outlet port of the turbine 4 is communicated with a heat exchanger 10 via a passage 11.

Consequently, the exhaust gas comprising the exhaust gas from the turbine 4, i.e., the exhaust gas discharged from the internal combustion engine 1 through the exhaust port 1a and the exhaust gas generated in the combustor 9 is introduced into the heat exchanger 10.

A hot water which has passed through a heat exchanger 12 for cooling the internal combustion engine is introduced into the heat exchanger 10.

This allows heat exchanging to be effected between the hot water and the exhaust gas in the heat exchanger 10.

Since the exhaust gas has a more quantity of heat by a quantity of heat involved in the combustion gas from the combustor 9 than that of the conventional apparatus, the apparatus of the present invention can satisfactorily be adapted to a case where there is a need of heating a large quantity of hot water to an elevated temperature or to produce steam.

Incidentally, in a case where the compressed air is burnt in the presence of a large quantity of fuel injected in the combustor 9, the turbine 4 tends to be rotated at an excessively high rotational speed so that the air supercharged by the blower 5 has an excessively high pressure and thereby the the cylinder of the internal combustion engine 1 has an inner pressure higher than the allowable pressure.

Figure 2:
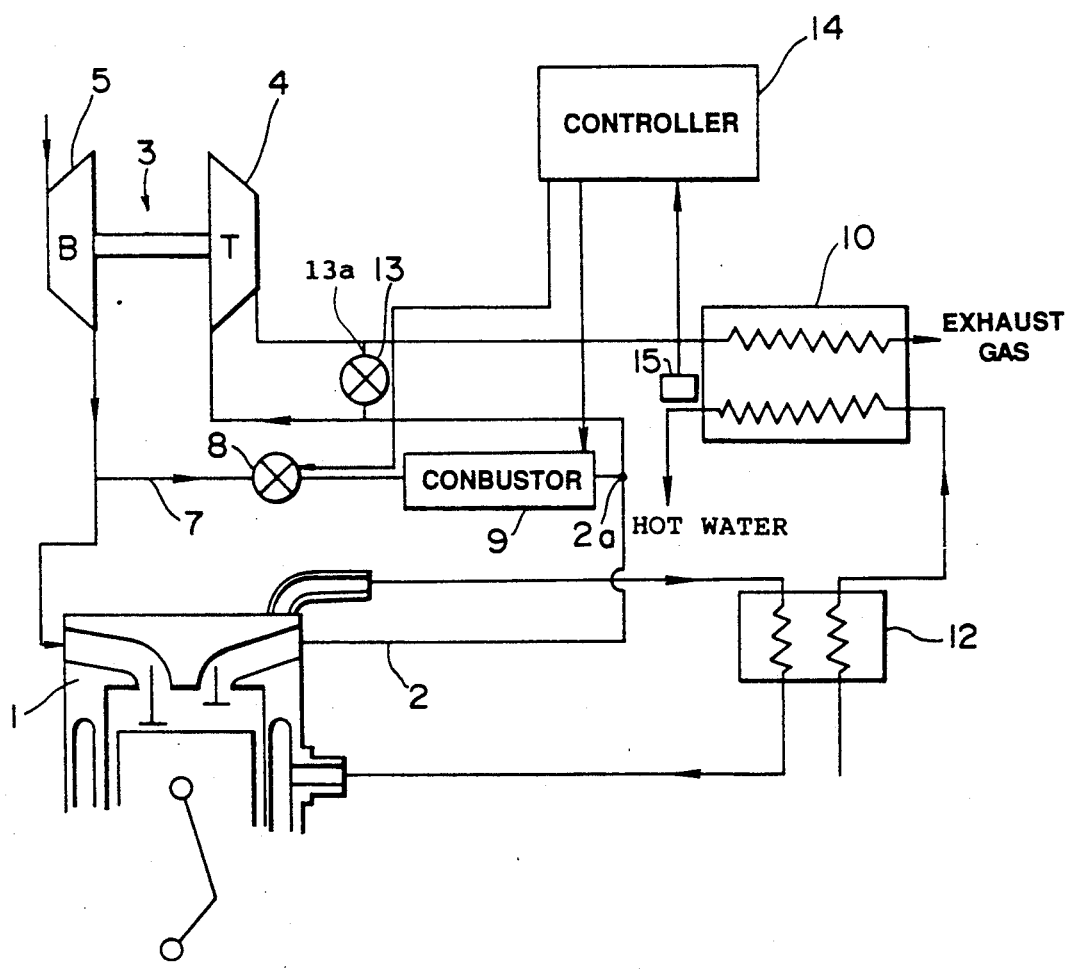
FIG. 2 is a schematic view illustrating a heat feeding apparatus employable for an internal combustion engine having a supercharger attached thereto in accordance with other embodiment of the present invention.
Figure 3:
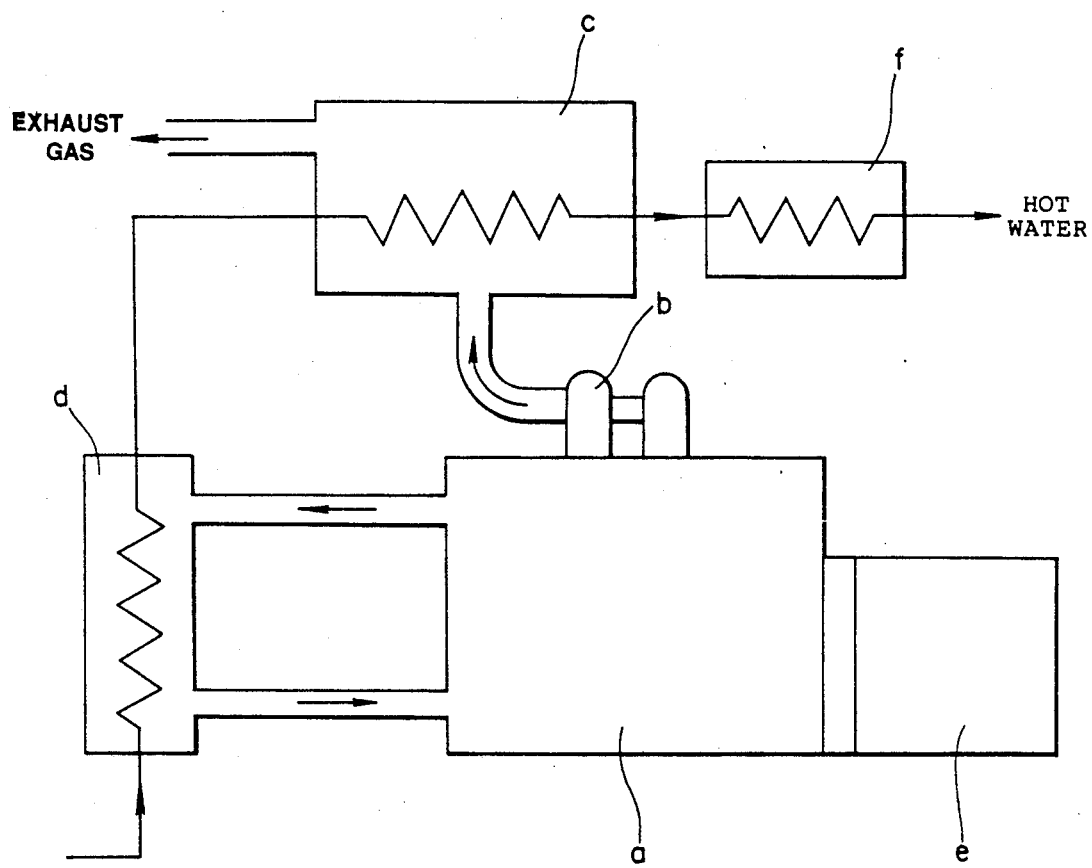
FIG. 3 is a schematic view illustrating by way of example a conventional heat feeding apparatus employable for an internal combustion engine having a supercharger attached thereto.

According to other aspect of the present invention, to prevent the turbine 4 from being rotated at an excessively high rotational speed and the internal combustion engine 1 from having an excessively high inner pressure, the apparatus has a passage 13a by way of which the inlet port of the turbine 4 is communicated with the outlet port of the same wherein a bypass valve 13 is disposed midway of the passage 13a, as shown in FIG. 2.

The bypass valve 13 can be designed in a hitherto known structure which assures that it is operable when the air supercharged by the blower 5 has a pressure higher than a predetermined value. With such bypass valve 13, a part of the exhaust gas can be introduced directly into the heat exchanger 10 but not via the turbine 4.

Thus, since the energy through the turbine 4 can be suppressed so as not to allow it to be increased in excess of a predetermined value, rotation of the turbine 4 at an excessively high rotational speed and excessive increase of pressure in the internal combustion engine can be prevented simultaneously.

Next, description will be made below as to a manner of controlling the opening/closing valve 8 and the combustor 9.

As shown in FIG. 1, the apparatus includes a controller 14 for controlling the opening/closing valve 8 and the combustor 9.

An output from a temperature sensor 15 for detecting the temperature of a hot water from the heat exchanger 10 is inputted into the controller 14.

When it is detected by the temperature sensor 15 that the hot water is heated up to a predetermined temperature, the controller 14 is activated to keep the opening/closing valve 8 fully closed.

Specifically, a signal is given to an actuator (not shown) for keeping the opening/closing valve 8 to fully close the latter. This causes the opening/closing valve 9 not to be opened. Since the compressed air bypass passage 7 is kept closed at this moment, only the exhaust gas discharged from the internal combustion engine 1 via the exhaust port 1a is introduced into the turbine 4 with the result that the exhaust gas having the same quantity of heat as the conventional apparatus is introduced into the heat exchanger 10.

On the contrary, when it is detected by the temperature sensor 15 that the hot water fails to be heated up to the foregoing predetermined temperature, the controller 14 is activated to give a signal to the actuator so as to allow the opening/closing valve 8 to be fully opened. As a result, the opening/closing valve 8 is fully opened so that a part of the compressed air compressed by the blower 5 is introduced into the inlet side of the turbine 4 via the opening/closing valve 8.

At this moment, the controller 14 controls the fuel injection valve and the igniter in the combustor 9 in order to assure that a required quantity of fuel is injected through the fuel injection nozzle and it is then ignited in the igniter 9.

Firstly, when it is found that the temperature detected by the temperature sensor 15 has been increased in excess of the predetermined temperature, the opening/closing valve 8 is kept fully closed and thereby no compressed air flows therethrough. At this moment, fuel is not injected into the combustor 9. Secondarily, when it is found that the temperature detected by the temperature sensor 15 has not been increased up to the predetermined temperature, the controller 14 is activated to control the combustor 9.

As long as the combustor 9 is controlled, fuel having a quantity corresponding to a magnitude of difference between the current temperature detected by the temperature sensor 15 and the foregoing predetermined temperature is injected through the fuel injection valve by driving a fuel injection pump which is not shown in the drawing.

Accordingly, the larger the demand for a quantity of heat in the heat exchanger 10 through which hot water flows, the more the fuel is injected in correspondence to the foregoing quantity of heat. This makes it possible to generate a combustion gas having higher temperature and higher pressure to satisfactorily meet the aforementioned demand.

Further, the apparatus is provided with a gas temperature sensor (not shown in FIG. 1) in the proximity of the combustor 9 to detect the temperature of the combustion gas generated in the latter.

When it is detected on the basis of an output from the gas temperature sensor that the combustion gas has a temperature lower than a predetermined threshold, the controller 14 is activated so as to energize the igniter. On the contrary, when it is found that the combustion gas has a temperature higher than the threshold, the controller 14 makes such a determination that an ignition has been completed. At this moment, the controller 14 performs a controlling operation so as to allow operation of the igniter to be interrupted. Consequently, combustion continues without reduction of a running life of the igniter.

Since it suffices that the combustor 9 is operated to burn in the presence of fuel the air compressed by the blower 5 to have a high density, it can be designed and constructed in smaller dimensions and thereby it can be produced at an inexpensive cost.

Incidentally, in the illustrated embodiment, theopening/closing valve 8 is controlled automatically. Alternatively, it may manually be opened or closed by an operator as required by visually confirming the temperature of a hot water in the heat exchanger 10 to make a proper determination.

In this case, it is required that operation of the combustor 9 is manually initiated under the same control as the controller 15 at the same time when the opening/closing valve 8 is opened.

Incidentally, in this case, there is a fear that an operator performs such an incorrect operation that the combustor 9 is operated while the opening/closing valve 8 is kept closed.

To prevent performance of such incorrect operation, the apparatus may be provided with a mechanism for opening the opening/closing valve 8 in association with operation of the combustor 9.

According to the embodiment as shown in FIG. 1, the combustor 9 is disposed midway of the exhaust gas passage 2. Alternatively, the combustor 9 may be disposed midway of the compressed air bypass passage 7 in the same manner as the opening/closing valve 8, as shown in FIG. 2. At any rate, the position where the combustor 9 is installed can arbitralily be determined, provided that it is proven that the compressed air which has passed through the opening/closing valve 8 can be burnt in the presence of fuel while it is disposed in the inlet region of the turbine 4.

What is claimed is:

1. A heat feeding apparatus comprising an internal combustion engine having a supercharger, said supercharger including a blower and a turbine each having an associated inlet and outlet, said combustion engine including a combustion chamber having an inlet and outlet, a first conduit connected between said blower outlet and said combustion chamber inlet for conducting compressed air from said blower to said combustion chamber, a second conduit connected between said combustion chamber outlet and said turbine inlet for conducting hot gasses from said combustion chamber to said turbine inlet, a bypass passage between said first and second conduits, a valve for opening and closing said bypass passage whereby in an open position of said valve compressed air from said blower is conducted through said bypass passage to said turbine inlet via said second conduit, combustion means between said valve and said turbine inlet for injecting fuel into the compressed air in said bypass passage, means for igniting said injected fuel and compressed air, means for effecting a heat exchange between a heat exchange medium and hot gasses exiting the turbine via the turbine outlet, means for detecting the temperature of the heat exchange medium; and means for responding to a detected first predetermined temperature of the heat exchange medium for closing said valve, and further responsive to a detected second predetermined temperature lower than said first predetermined temperature for opening said valve and operating said ignition means for igniting said fuel.

2. The heat feeding apparatus as defined in claim 1 wherein said responding means is effective for controlling said combustion means in such a manner than the more the difference between the temperature of said medium and said predetermined temperature, the larger the quantity of fuel is injected by said combustion means.

3. The heat feeding apparatus as defined in claim 1 wherein said responding means controls the operation of said igniting means only when the exhaust gas is at a temperature lower than said predetermined temperature.

4. The heat feeding apparatus as defined in claim 2 wherein said responding means controls the operation of said igniting means only when the exhaust gas is at a temperature lower than said predetermined temperature.

* * * * *